Sept. 7, 1954  J. P. NICOLAS, JR  2,688,454
WIRE REEL SUPPORT

Filed April 15, 1952  2 Sheets-Sheet 1

Inventor
Joseph P. Nicolas, Jr.

By
Attorneys

Sept. 7, 1954  J. P. NICOLAS, JR  2,688,454
WIRE REEL SUPPORT
Filed April 15, 1952  2 Sheets-Sheet 2
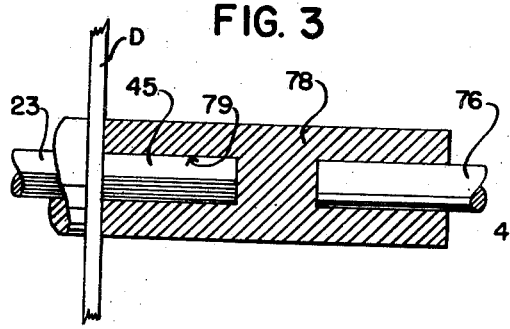
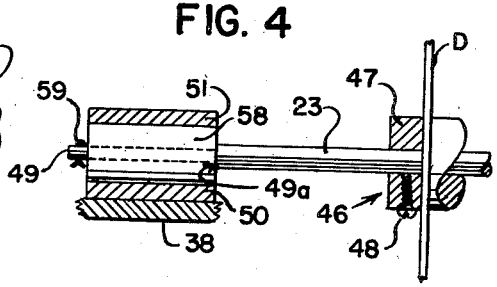
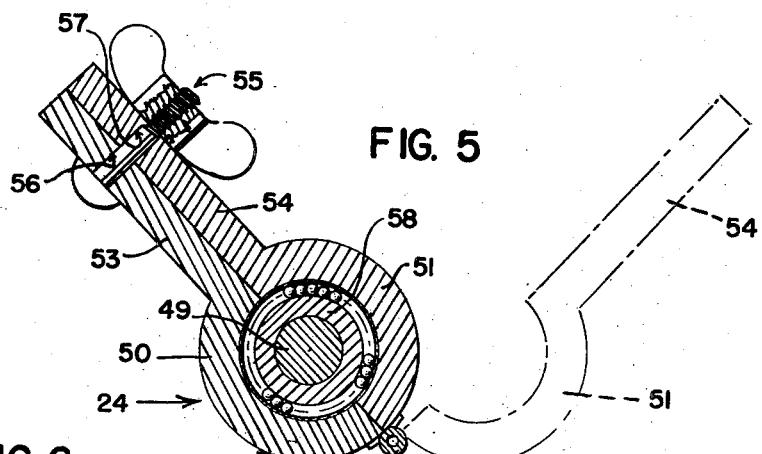
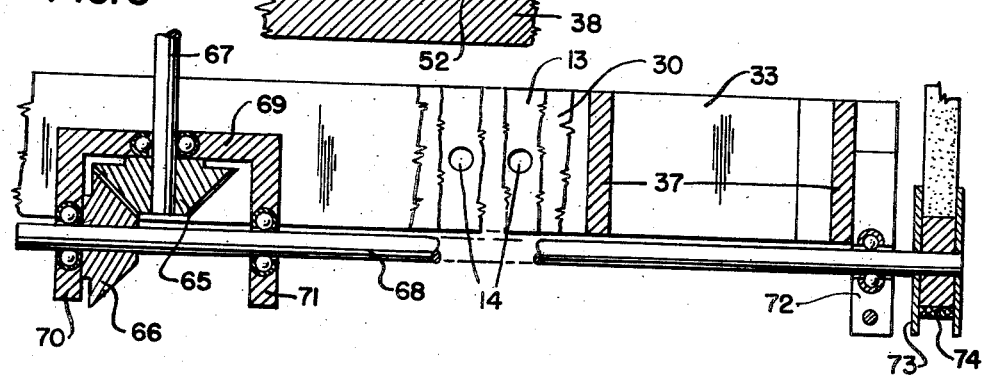
Inventor
Joseph P. Nicolas, Jr.

Patented Sept. 7, 1954

2,688,454

UNITED STATES PATENT OFFICE 2,688,454

WIRE REEL SUPPORT

Joseph P. Nicolas, Jr., Bellwood, Nebr.

Application April 15, 1952, Serial No. 282,442

4 Claims. (Cl. 242—90)

This invention relates to self-propelled vehicle supported reels, rotated by means of the motive power of the vehicle. Such reels may be for wire, and the vehicle may be a tractor having a power take-off for rotating the reels.

An important object of the invention is to provide a simple but sturdy reel support for detachable connection with a vehicle and which is adapted to removably mount a reel.

Another important object is to provide a reel support as described which includes means to rotate a shaft which, in turn, rotates the reel spool, the shaft being quickly detachable with the reel spool mounted thereon, yet the reel spool may be readily slid off the shaft when the latter is removed from the reel support frame.

Still another important object of the invention is to provide for ready attachment of the reel support frame to a conventional drawbar of a tractor, employing ordinary nut and bolt assemblies.

A further object is to provide a reel support for attachment to a tractor in such a way that the support is disposed a substantially equal distance to either side of the longitudinal medial line of the tractor.

Other objects and advantages of the invention will be apparent during the course of the following detailed description of the invention, taken with the accompanying drawings forming portions of this disclosure and in which drawings:

Fig. 3 is a vertical longitudinal section substantially on the line 3—3 of Fig. 2.

Fig. 4 is a longitudinal vertical section of a bearing forming a part of the reel support, substantially on the line 4—4 of Fig. 2.

Fig. 5 is a transverse vertical section of the bearing of Fig. 4 but in an open position.

Fig. 6 is a horizontal longitudinal section of the lower portion of the new reel support, substantially on the line 6—6 of Fig. 2.

Figure 1:
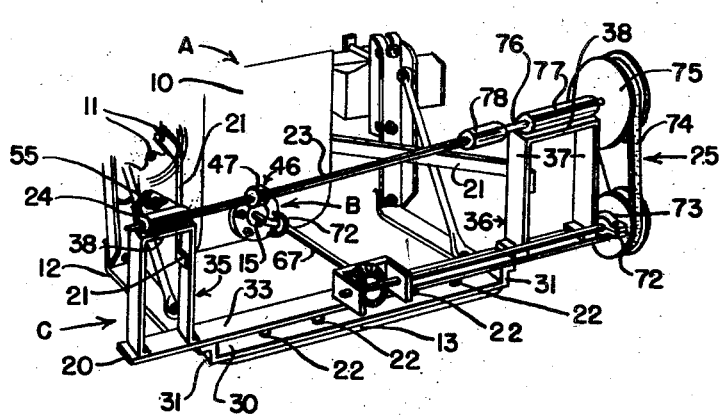
Fig. 1 is a perspective view of a portion of a conventional tractor with the new reel support mounted upon the drawbar bracket thereof and operatively connected with the power take-off of the tractor.

In the drawings wherein for the purpose of illustration is shown a preferred embodiment of the invention and wherein similar reference characters designate corresponding parts throughout the several views, the letter A designates a wheeled vehicle having a power take-off B; the letter C, the new reel support and rotating means; and D a reel spool supported by the means C.

The vehicle A may be a conventional tractor having a differential housing 10 comprising a plurality of exterior wall portions conventionally detachably connected, as by a plurality of bolt and nut assemblies 11 at opposite sides of the housing. The vehicle A is also provided with a drawbar including a substantially horizontally-disposed bracket 13 extending transversely of the tractor and generally below the plane of the bottom of the differential housing and to the rear of this housing. The bracket 13 is conventionally provided with a plurality of spaced-apart bolt shank-receiving holes 14 extending longitudinally of the bracket, and shown in Fig. 6.

A conventional power take-off B includes a shaft 15 extending from the differential housing and conventionally rotatable in either direction as desired.

The new reel support and rotating means C comprises a frame 20, braces 21 therefor, means 22 to detachably mount the frame upon the drawbar 12, a removable shaft 23, bearing 24 for the shaft 23 and power transmitting means 25 between the power take-off shaft 15 and the removable shaft 23.

Figure 2:
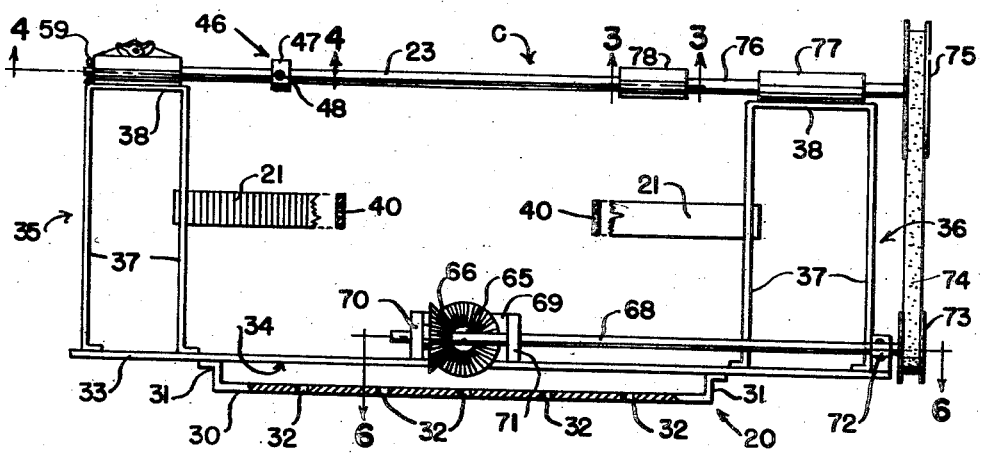
Fig. 2 is an elevation of the reel support removed from the tractor.

As may be seen, particularly in Fig 2, the frame 20 is generally longer than the drawbar bracket 13 upon which it is mounted, and includes a lowermost substantially straight, horizontally-disposed portion 30 with upwardly extending inverted L-shaped extensions 31 at its ends. The portion 30 is provided with a plurality of spaced-apart holes or openings 32, shown in Fig. 2, with these holes spaced longitudinally of the portion 30 so that they will axially align with at least some of the holes 14 in the drawbar bracket 13 and the holes 14 and 32 are preferably of the same diameters.

Welded or otherwise secured to the uppermost horizontal parts of the extensions 31 is an elongated portion or bar 33, whereby there is a space 34 provided between the two portions 30 and 33. Welded or otherwise secured to the portion 33, preferably at its outer end parts, are two upwardly-extending bearing supports 35 and 36. Each may comprise a pair of spaced-apart legs 37 with a horizontally-disposed part 38 joining them.

Extending from like legs 37 are two braces 21 which may be welded at one like end of each to its associated leg and the braces, which may be stout rods, extend forwardly to the differential housing 10 and have, at their other like ends, holes or openings 40 to receive the shanks of some of the nut and bolt assemblies 11 whereby the braces 21 may be secured to this housing without the employment of special securing means.

Means 22 to mount the frame 20 upon the drawbar 12 at the bracket 13 may be conventional nut and bolt assemblies with the shanks of the bolts extending through the axially-aligned holes 14 and 32 and the nuts accommodated in the space 34.

The removable shaft 23 for the reel D is an elongated rod, which may have one extremity 45 polygonal (preferably square) in transverse section and the shaft carries an adjustable means 46 to limit movement in one direction of a reel spool mounted on the shaft 23. This means 46 may be a sleeve 47 slidable along the shaft and having a set screw 48 to secure it to the shaft. The opposite extremity or end portion 49 of the shaft 23 is cylindrical and a shoulder 49$^a$ is provided spaced inwardly from this cylindrical portion.

Referring mainly to Fig. 5, the bearing 24 comprises a fixed half portion 50 secured to the part 38 of the support 35, and a movable half portion 51 which is preferably hinged to the portion 50 as by the hinge 52 and each portion 50 and 51 has an extension 53 and 54 respectively, extending longitudinally thereof to meet when the bearing portions are closed as in full lines in Fig. 5 and retained closed as by a thumb nut and bolt assembly 55 with the shank of the bolt of the assembly extending through suitable aligning openings 56 and 57 in the extensions 53 and 54. The end portion 49 of the shaft 23 mounts a ball bearing race or assembly 58 with one end of the outer assembly housing abutting the shoulder 49$^a$ and the other end of this housing retained by an abutment as a cotter pin 59 adjacent the outer end of the end portion 49, which extends through a suitable opening transversely of the portion 49. The ball bearing race or assembly 58 is, of course, enclosed and gripped by the walls of the bearing 24.

The power transmitting means 25 includes two meshing bevel gears 65 and 66 mounted upon shafts 67 and 68 respectively with the shafts journalled in bearings 69, 70 and 71 fixedly carried by the frame portion 33. The shaft 67 carrying the gear 65 extends through the bearing 69, whose longitudinal axis substantially parallels that of the portion 33, and this shaft carries a conventional universal joint 72, for operative connection with the shaft 15 of the power take-off B. The shaft 68 mounts the bevel gear 66 and extends through the bearings 70 and 71. Its outer end extends through a split bearing 72 and fixedly mounts a pulley 73 over which is trained a belt 74 which is also trained over a pulley 75 fixedly carried by a shaft 76 extending through a bearing 77 secured to the upper face of the portion 38 of the bearing support 36. The free end portion of the shaft 76 fixedly carries a socketed means which is a member 78 having a polygonal (preferably square walled) socket 79 to slidably receive the like polygonal extremity 45 of the shaft 23. The member 78 has an additional function since it provides an abutment (cooperating with the abutment 47) to limit movements of a reel spool mounted upon the shaft 23, as is now obvious.

With the power shut off, the two parts of the bearing 24 are separated and the shaft 23 withdrawn from the socket 79 and a reel D mounted upon the shaft. The square extremity 45 of the shaft 23 is then inserted into the socket 79 and the opposite end portion 49 is disposed within the bearing, with the extension parts 53 and 54 separated whereupon the parts 53 and 54 are secured together by the means 55. Thereupon the sleeve 47 is slid along the shaft 23 to abut one end of the reel spool, while the other end of the latter abuts the member 78. Upon rotation of the shaft 15, power will be imparted to the shaft 23 to either reel in upon the reel or pay out therefrom a flexible strand, as wire.

It is clear that when a reel spool D is to be removed from the shaft 23, it may be readily slid off the shaft, since the extremity 45 of the latter is free of the socketed member 78 which otherwise limits sliding movement of the reel spool.

Various changes may be made to the form of the invention herein shown and described without departing from the spirit of the invention or scope of the claims.

What is claimed is:

1. In combination with the horizontal drawbar bracket of a tractor, a reel support including a frame provided with a lowermost elongated horizontally-disposed portion having inverted L-shaped extremities, an uppermost elongated portion rigidly mounted upon said extremities, with said portions providing a space between them, spaced-apart supports extending from said uppermost portion and away from said space, a reel spool shaft, means carried by said supports for rotatably mounting said reel spool shaft thereon, and means for removably securing said lowermost portion to said bracket, said last-named means extending into said space.

2. In combination with the horizontal drawbar bracket of a tractor, a reel support including a frame provided with a lowermost elongated horizontally-disposed portion having inverted L-shaped extremities, an uppermost elongated portion rigidly mounted upon said extremities, with said portions providing a space between them, spaced-apart supports extending from said uppermost portion and away from said space, a reel shaft, means carried by said supports for rotatably mounting said reel spool shaft thereon, and means for removably securing said lowermost portion to said bracket, said last-named means extending into said space and being below and remote from said shaft.

3. In combination with the horizontal drawbar bracket and power take-off of a tractor, a reel support including a frame provided with a lowermost elongated horizontally-disposed portion having inverted L-shaped extremities, an uppermost elongated portion rigidly mounted upon said extremities, with said portions providing a space between them, spaced-apart supports extending from said uppermost portion and away from said space, a reel spool shaft, means carried by said supports for rotatably mounting said reel spool shaft thereon, means for rotating said reel spool shaft by said power take-off including a shaft, operatively connected with said power take-off and rotatably carried by said uppermost elongated portion, and means for removably securing said lowermost portion to said bracket, said last named means extending into said space and out of the path of said means for rotating said reel spool shaft.

4. In combination with the horizontal drawbar bracket and power take-off of a tractor, a reel support including a frame provided with a lowermost elongated horizontally-disposed portion having upwardly-extending extremities, an uppermost elongated portion rigidly mounted upon said extremities, with said portions providing a space between them, spaced-apart supports extending from said uppermost portion and away from said space, a reel spool shaft, means carried by said supports for rotatably mounting said reel spool shaft thereon, means for rotating said reel spool shaft by said power take-off including a shaft, operatively connected with said power take-off and rotatably carried by said uppermost elongated portion, and means for removably securing said lowermost portion to said bracket, said last named means extending into said space and out of the path of said means for rotating said reel spool shaft.

References Cited in the file of this patent

UNITED STATES PATENTS

| Number | Name | Date |
|---|---|---|
| 324,887 | Shoesmith | Aug. 25, 1885 |
| 1,142,035 | Hanson | June 8, 1915 |
| 1,654,106 | Allensworth et al. | Dec. 27, 1927 |
| 2,344,795 | Weber | Mar. 21, 1944 |